Patented Jan. 26, 1932

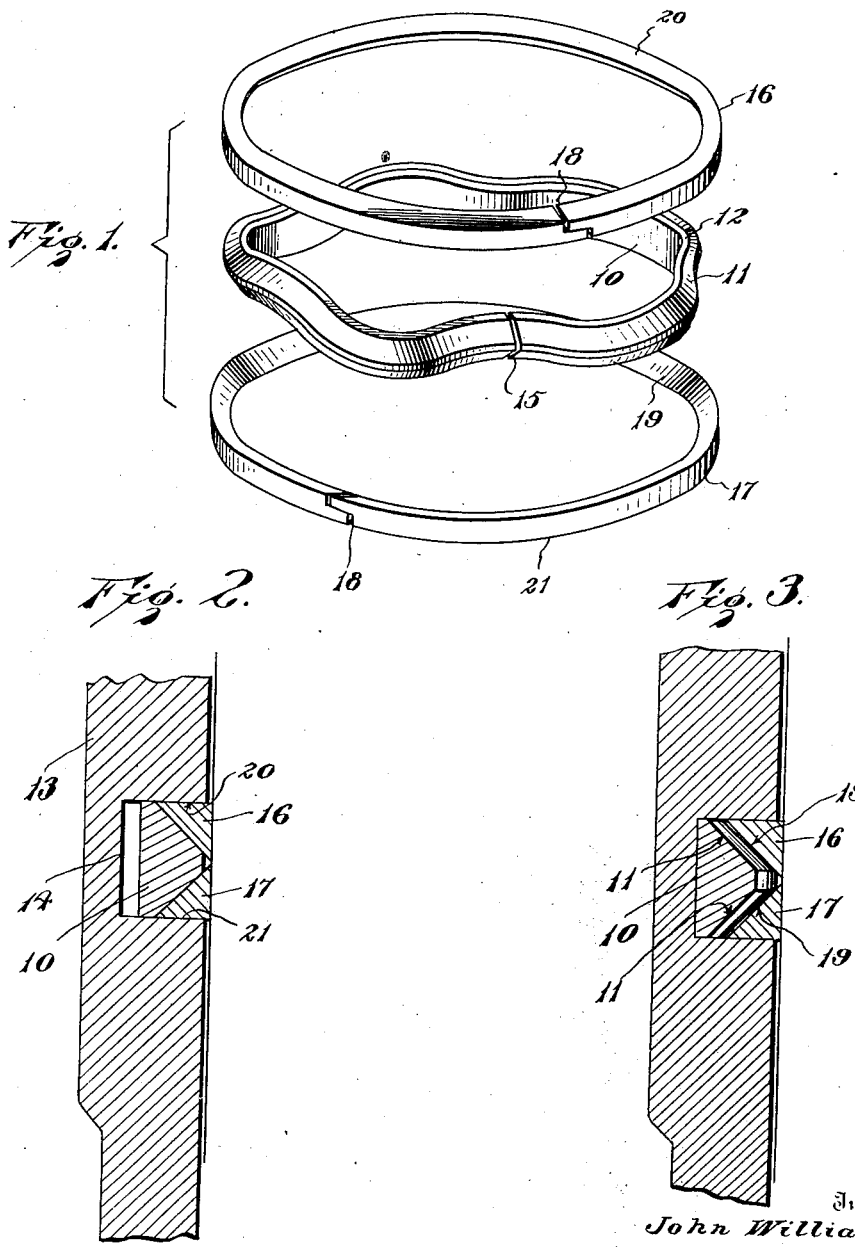

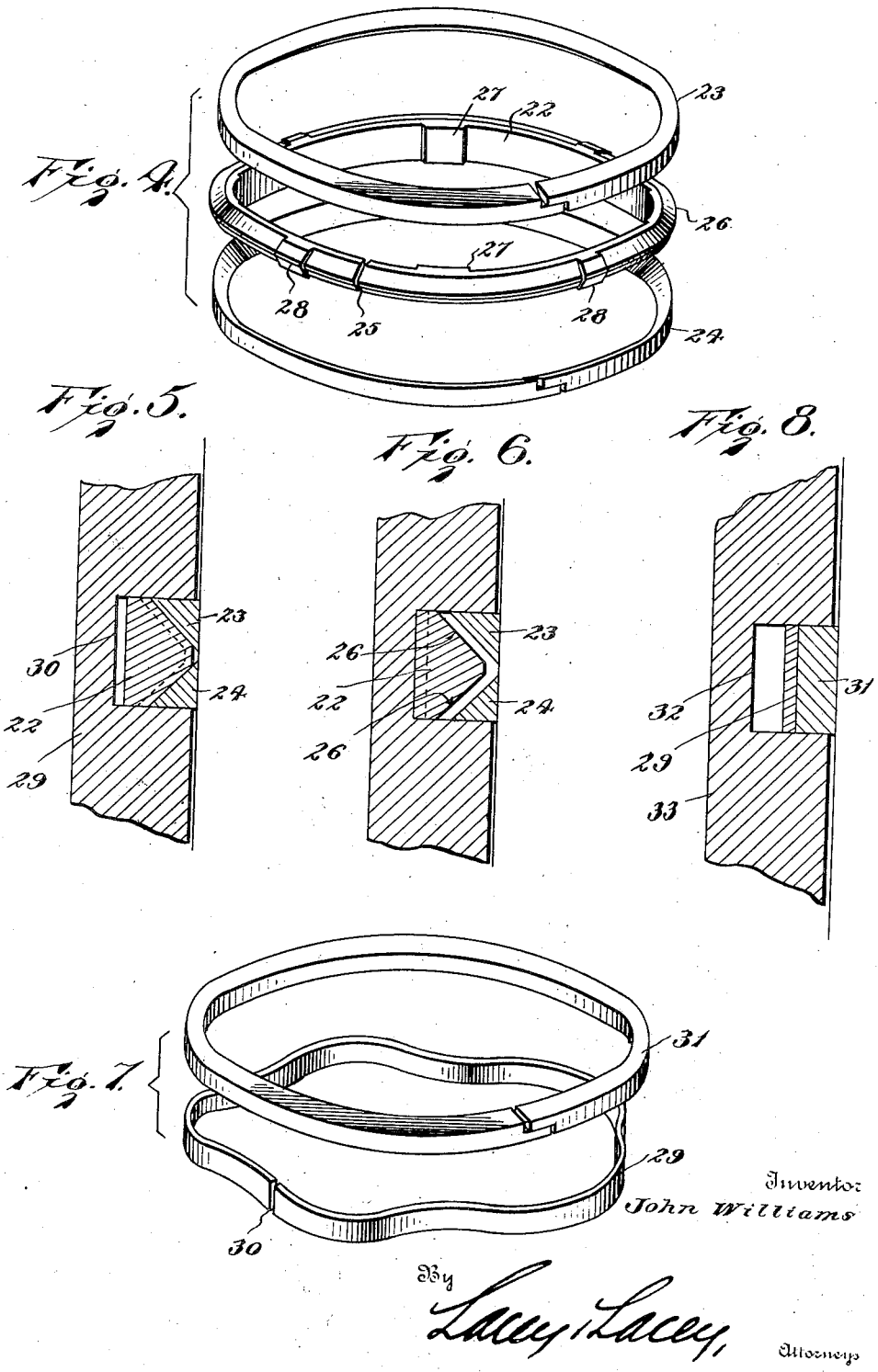

1,842,853

UNITED STATES PATENT OFFICE

JOHN WILLIAMS, OF PHILADELPHIA, PENNSYLVANIA

COMPOSITE PISTON RING

Application filed October 10, 1929. Serial No. 393,767.

This invention relates to an improved composite piston ring and seeks, among other objects, to provide a ring wherein a tight seal will at all times be formed not only between the ring and the cylinder wall, but also between the ring and the top and bottom walls of the ring groove.

The invention seeks, as a further object, to provide a ring including upper and lower ring members which will be constantly urged to seat against the top and bottom walls of the ring groove and wherein said members will have a wide bearing area in contact with said walls.

And the invention seeks, as a still further object, to provide a ring which will serve to more or less solidly support the piston against rocking movement and thus prevent piston slip.

Other objects of the invention not specifically mentioned in the foregoing will appear during the course of the following description.

In the drawings:

Figure 1 is a perspective view showing the elements of my improved piston ring,

Figure 2 is a detail sectional view taken through the ring at the outer peripheral crest of one of the corrugations of the expander, Figure 3 is a detail sectional view taken through the ring at the inner peripheral crest of another of the corrugations of the expander, Figure 4 is a perspective view showing the elements of a modified form of ring, Figure 5 is a detail sectional view taken through the ring of Figure 4 at one of the outer peripheral bearing lugs of the expander, Figure 6 is a detail sectional view taken through the ring of Figure 4 at one of the inner peripheral lugs of the expander, Figure 7 is a perspective view showing the elements of a further modified form of ring, and Figure 8 is a detail sectional view taken through the ring of Figure 7.

Referring now more particularly to Figures 1 to 3 inclusive of the drawings, I employ a radially corrugated expander 10 which is provided with a flat inner face and beveled upper and lower outer faces 11 converging medially of the outer periphery of the expander. The expander is further provided at its inner periphery with flat upper and lower faces 12. As seen in Figures 2 and 3 of the drawings, the expander 10 is of a width to fit snugly but slidably within a piston ring groove, a portion of a piston being conventionally illustrated at 13 and one of the ring grooves thereof at 14. As will be observed, the flat faces 12 of the expander contact the top and bottom walls of the ring groove so that the expander is thus limited against movement axially of the piston and, as shown in Figure 1, the expander is split as indicated at 15 so that it may be readily applied about the piston and disposed in the ring groove. Preferably the expander is of cast iron. If of appreciable thickness, such as shown in the present instance, the expander is first heated and is then corrugated after which the expander is allowed to cool so that the corrugations are thus set. Any suitable number of corrugations may of course be employed. In any instance where the expander is of less thickness so that it may be flexed without danger of snapping, the expander may be distorted when cold to produce corrugations therein, after which the expander may be heated and allowed to cool for setting the corrugations. In either event, the expander will be resilient.

Formed to coact with the expander is an upper ring member 16 and a like lower ring member 17. These members are, like the expander, preferably formed of cast iron and are each split as indicated at 18 so that said members may be readily applied. As brought out in Figure 2 the members 16 and 17 are formed with beveled inner faces 19 to coact with the beveled faces 11 of the expander, each of said members being substantially triangular in cross-section. The ring member 16 is formed with a flat upper face 20 to seat flat against the top wall of the ring groove while the ring member 17 is provided with a flat lower face 21 to seat flat against the bottom wall of the ring groove and in this connection attention is directed to the fact that the faces 20 and 21 are relatively wide to provide a correspondingly large bearing area between said ring members and the upper and lower walls of the groove. Premature wear of the ring members will thus be overcome.

When the elements of the piston ring are disposed in the ring groove 14 and confined by the cylinder wall, the crests of the corrugations at the inner periphery of the expander 10 seat, as shown in Figure 3, flat against the bottom wall of the ring groove, while the crests at the outer periphery of the expander are brought under tension so as to yieldably press outwardly against the ring members 16 and 17. Thus, these members are yieldably held throughout their circumference, in contact with the cylinder wall so as to form a tight seal between the piston and the cylinder. Also, as the crests of the corrugations at the inner periphery of the expander seat against the bottom wall of the ring groove, as stated, radial shifting of the expander in the groove will be prevented so that the several elements of the ring will coact with each other, with the cylinder wall and with the piston for more or less rigidly sustaining the piston against rocking movement. Piston slap will thus be overcome. Furthermore, the beveled faces 11 of the expander will coact with the beveled faces 19 of the ring members 16 and 17 for urging said members apart. Thus, the flat face 20 of the ring member 16 will be held tightly in contact with the top wall of the ring groove while the flat face 21 of the ring member 17 will be held tightly in contact with the bottom wall of the ring groove to provide tight seals between the ring members and said walls.

In Figures 4, 5 and 6 of the drawings I have illustrated a variation of the invention wherein I employ an expander 22, an upper ring member 23 and a lower ring member 24. The expander 22 is circular, being split as indicated at 25, and is provided with beveled faces 26. The expander 22 is thus, in general construction, like the expander 10, being formed of cast iron and being of the same cross-sectional contour as the expander 10. Formed on the inner periphery of the expander, at circumferentially spaced points are lugs 27, and formed on the outer periphery of the expander at points substantially midway between the lugs 27 are beveled lugs 28, the inclined faces of which substantially conform to the inclination of the beveled faces 26. The ring members 23 and 24 are identical with the ring members 16 and 17 and therefore need not be further described at this point.

For convenience I have shown a portion of a conventional piston at 29 and one of the ring grooves of the piston at 30. When the elements of the ring are disposed in the ring groove, the lugs 27 of the expander 26 seat, as shown in Figure 6, flat against the bottom wall of the ring groove, while the upper and lower flat faces of the expander snugly but slidably contact the top and bottom walls of said groove. Thus, the expander is supported at its inner periphery at circumferentially spaced points and as shown in Figure 5, the beveled faces of the lugs 28 fit the beveled faces of the ring members 23 and 24. Accordingly, these ring members are likewise supported at their inner peripheries at circumferentially spaced points and as the ring members are of course compressed by the cylinder wall within the ring groove, the ring members are caused to exert a pressure on the expander 22 at the lugs 28. The segments of the expander between each pair of the lugs 27 are thus brought under tension. These segments will thus be caused to yieldably press outwardly on the ring members 23 and 24 for holding these ring members throughout their circumference tightly in contact with the cylinder wall to provide a sealed joint between the piston and the cylinder. Furthermore, the beveled faces of the lugs 28 will act on the beveled faces of the ring members for urging these members apart and tightly holding the flat faces thereof in contact with the top and bottom walls of the ring groove to provide sealed joints between the ring and said walls.

In Figures 7 and 8 of the drawings I have illustrated a still further modification of the invention wherein I employ an expander 29. This expander is of the ribbon type, and is formed of cast iron like the expanders of the prior embodiments of the invention, being split as indicated at 30. As will be observed, the expander is radially corrugated like the expander shown in Figure 1 but is rectangular in cross-section. In conjunction with the expander 29 I employ a ring member 31 and in Figure 8 have shown the expander and the ring member in position in one of the ring grooves 32 of a conventional piston 33. As will be observed, the ring member and expander are of a width to snugly but slidably fit within the groove and, of course, the crests of the corrugations of the expander at the inner periphery thereof bear against the bottom wall of the ring groove while the crests of the corrugations at the outer periphery of the expander bear against the inner circumference of the ring member 31 and as the ring member is compressed by the cylinder wall within the ring groove, the expander will, as will be readily appreciated in view of the foregoing description, be brought under tension for tightly holding the ring member against the cylinder wall to provide a sealed joint between the piston and said wall.

Having thus described the invention, I claim:

The combination with a piston having a ring groove, of upper and lower split piston rings having converging beveled faces, and a split follower ring of substantially wedge-shaped cross section fitting against the beveled faces of the piston rings, said follower ring having annular parallel flat lateral faces snugly engaging the side walls of the piston ring groove, said piston rings having annular parallel flat lateral faces substantially flush with the corresponding lateral faces of the follower ring and snugly engaging said side walls of said piston ring groove, said follower ring having radially disposed bosses projecting from the outer and the inner peripheries of the ring, the inner bosses being flat and the outer bosses being wedge-shaped, alternate bosses projecting inwardly beyond the inner periphery of the follower ring and intimately engaging the bottom wall of the piston ring groove whereby pressure exerted on said alternate bosses by said bottom wall serves to expand the follower ring radially against and force the bosses on the outer periphery of the follower ring radially between the beveled faces of said piston rings to seat the piston rings radially against the cylinder wall and seat the piston rings vertically against the side walls of the piston ring groove.

In testimony whereof I affix my signature.

JOHN WILLIAMS. [L. S.]